United States Patent
Sultan et al.

(10) Patent No.: US 7,813,279 B2
(45) Date of Patent: Oct. 12, 2010

(54) SYSTEM FOR RATE MANAGEMENT OF AGGREGATE-RATE COMMUNICATION SERVICES

(75) Inventors: Robert Sultan, Somers, NY (US); Linda Dunbar, Plano, TX (US); Lucy Yong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 768 days.

(21) Appl. No.: 11/622,744

(22) Filed: Jan. 12, 2007

(65) Prior Publication Data

US 2007/0165627 A1    Jul. 19, 2007

Related U.S. Application Data

(60) Provisional application No. 60/758,870, filed on Jan. 13, 2006, provisional application No. 60/820,202, filed on Jul. 24, 2006.

(51) Int. Cl.
*G01R 31/08* (2006.01)

(52) U.S. Cl. .................... 370/230.1; 370/235

(58) Field of Classification Search ............. 370/230, 370/230.1, 232, 233, 234, 235, 395.2, 395.41
See application file for complete search history.

(56) References Cited

U.S. PATENT DOCUMENTS

| | | | |
|---|---|---|---|
| 4,827,477 A * | 5/1989 | Avaneas ..................... 714/757 |
| 5,535,193 A | 7/1996 | Zhang et al. | |
| 5,748,901 A * | 5/1998 | Afek et al. ................... 709/238 |
| 5,857,147 A | 1/1999 | Gardner et al. | |
| 5,914,945 A | 6/1999 | Abu-Amara et al. | |
| 6,341,134 B1 | 1/2002 | Toutain et al. | |
| 6,515,969 B1 | 2/2003 | Smith | |
| 6,665,733 B1 | 12/2003 | Witkowski et al. | |
| 6,850,540 B1 * | 2/2005 | Peisa et al. .................. 370/468 |
| 7,072,295 B1 * | 7/2006 | Benson et al. ............... 370/230 |
| 7,102,997 B2 | 9/2006 | Sultan et al. | |
| 7,355,969 B2 | 4/2008 | Champlin et al. | |
| 7,372,814 B1 * | 5/2008 | Chiruvolu et al. ........... 370/235 |
| 7,515,535 B2 | 4/2009 | Finn | |
| 2002/0085559 A1 | 7/2002 | Gibson et al. | |
| 2003/0097461 A1 * | 5/2003 | Barham et al. ............... 709/235 |
| 2003/0133415 A1 | 7/2003 | Kim et al. | |

(Continued)

FOREIGN PATENT DOCUMENTS

CN    1426651 A    6/2003

(Continued)

OTHER PUBLICATIONS

Foreign Communication From a Related Counterpart Application—Supplementary European Search Report, EP 07785404.0, Nov. 28, 2008, 12 pages.

(Continued)

*Primary Examiner*—Derrick W Ferris
*Assistant Examiner*—Peter Cheng
(74) *Attorney, Agent, or Firm*—Conley Rose, P.C.; Grant Rodolph

(57) ABSTRACT

A system for rate management of communication services. The system comprises at least one group of ports sharing a guaranteed-rate; and each of the group of ports determines an allowed-rate using at least one rate management policy.

25 Claims, 2 Drawing Sheets

U.S. PATENT DOCUMENTS

| | | | |
|---|---|---|---|
| 2003/0163593 A1* | 8/2003 | Knightly | 709/251 |
| 2003/0165146 A1 | 9/2003 | Sultan et al. | |
| 2003/0172362 A1 | 9/2003 | Mack-Crane et al. | |
| 2003/0227926 A1 | 12/2003 | Ramamurthy et al. | |
| 2005/0044272 A1* | 2/2005 | Uzun et al. | 709/245 |
| 2005/0073952 A1* | 4/2005 | Champlin et al. | 370/229 |
| 2005/0213558 A1* | 9/2005 | Levit et al. | 370/351 |
| 2005/0262264 A1 | 11/2005 | Ando et al. | |
| 2006/0018313 A1 | 1/2006 | Oki et al. | |
| 2006/0098672 A1 | 5/2006 | Schzukin et al. | |
| 2006/0176900 A1 | 8/2006 | Liu et al. | |
| 2007/0143490 A1* | 6/2007 | Gallou et al. | 709/231 |
| 2007/0165527 A1 | 7/2007 | Sultan et al. | |
| 2007/0165626 A1 | 7/2007 | Sultan et al. | |
| 2007/0263640 A1 | 11/2007 | Finn | |

FOREIGN PATENT DOCUMENTS

| | | |
|---|---|---|
| CN | 1534926 A | 10/2004 |
| CN | 1585504 A | 2/2005 |
| CN | 1614944 A | 5/2005 |
| CN | 1780347 A | 5/2006 |
| CN | 1897492 A | 1/2007 |
| EP | 1460808 A2 | 9/2004 |
| GB | 2342825 A | 4/2000 |
| WO | 2005013513 A1 | 2/2005 |

OTHER PUBLICATIONS

Metro Ethernet Forum, Technical Specification, D00044_004, "Ethernet Services Attributes—Phase 2—Approved Draft 4," dated Aug. 27, 2006, 17 pages, The Metro Ethernet Forum 2005.

Metro Ethernet Forum, Technical Specification, D00044_006, "Ethernet Services Attributes—Phase 2—Approved Draft 6," dated Jul. 27, 2006, 69 pages, The Metro Ethernet Forum 2005.

IEEE Computer Society, IEEE Standard for Local and Metropolitan Area Networks, "Virtual Bridged Local Area Networks, Amendment 4: Provider Bridges," IEEE Std 802.1ad™, May 26, 2006, 74 pages.

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (1-100).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (101-200).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 100 pages (201-303).

IEEE, Information Technology- Telecommunications and Information Exchange Between Systems- Local and Metropolitan Area Networks- Specific Requirements, "Part 3: Carrier Sense Multiple Access With Collision Detection (CSMA/CD) Access Method and Physical Layer Specifications," IEEE Std 802.3™, 2005, 87 pages (301-387).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (25 cover pages + 1-75).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (76-175).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (176-275).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17#, Sep. 24, 2004, 100 pages (276-373).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (374-473).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (474-573).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 91 pages (574-664).

Foreign Communication From a Related Counterpart Application—International Search Report and Written Opinion, PCT/CN2007/070348, Nov. 8, 2007, 12 pages.

Duffield, Nick, et al., "A Performance Oriented Service Interface for Virtual Private Networks," Internet Engineering Task Force, Internet Draft, draft-duffield-vpn-qos-framework-00.txt, 28 pgs., Nov. 1998.

Office Action dated Jun. 23, 2009, U.S. Appl. No. 11/622,646 filed on Jan. 12, 2007, 29 pages.

Foreign Communication From a Related Counterpart Application—European Supplementary Search Report, EP 07785378.6, Nov. 3, 2008, 8 pages.

Foreign Communication From a Related Counterpart Application—International Search Report and Written Opinion, PCT/CN2007/070350, Sep. 27, 2007, 7 pages.

Foreign Communication From a Related Counterpart Application—European Supplementary Search Report, EP 07764275.9, May 26, 2009, 7 pages.

Foreign Communication From a Related Counterpart Application—International Search Report and Written Opinion, PCT/CN2007/070351, Nov. 1, 2007, 8 pages.

Foreign Communication from a Counterpart Application—European application No. 07764275.9—European office action dated Nov. 12, 2009, 3 pages.

Office Action dated Feb. 16, 2010, U.S. Appl. No. 11/622,646, filed on Jan. 12, 2007, 29 pages.

Office Action dated Jan. 21, 2010, U.S. Appl. No. 11/622,536, filed on Jan. 12, 2007, 38 pages.

Foreign communication from a related counterpart application—European Office Action—EP 07764275.9, Nov. 12, 2009, 3 pages.

Office Action dated Jul. 14, 2010, U.S. Appl. No. 11/622,646, filed on Jan. 12, 2007, 38 pages.

Office Action dated Jul. 9, 2010, U.S. Appl. No. 11/622,536, filed on Jan. 12, 2007, 46 pages.

Newton, Harry. "Newton's Telecom Dictionary," Feb. 2006. CMP Books. 22nd Ed. P. 1009. p. 733.

\* cited by examiner

SYSTEM FOR RATE MANAGEMENT OF AGGREGATE-RATE COMMUNICATION SERVICES

PRIORITY CLAIM

This application claims the priority of: U.S. Provisional Application No. 60/758,870, filed on Jan. 13, 2006, "METHOD OF RATE CONTROL FOR AN ETHERNET VIRTUAL SHARED MEDIUM" by Robert Sultan; and U.S. Provisional Application No. 60/820,202, filed on Jul. 24, 2006, "SYSTEM AND METHOD OF RATE-CONTROL FOR AN ETHERNET VIRTUAL SHARED MEDIUM" by Robert Sultan, Stein Gjessing, Xuan Zhang, Zhushen Deng, Linda Dunbar, Lucy Yong, Jianfei He, and Xixiang Li.

CROSS-REFERENCE TO RELATED APPLICATIONS

This application is related to: U.S. application Ser. No. 11/622,536, filed concurrently with the present application on Jan. 12, 2007, "SYSTEM FOR PROVIDING AGGREGATE-RATE COMMUNICATION SERVICES", by Robert Sultan, and Linda Dunbar; and U.S. application Ser. No. 11/622,646, filed concurrently with the present application on Jan. 12, 2007, "SYSTEM FOR RATE-CONTROL OF AGGREGATE-RATE COMMUNICATION SERVICES", by Robert Sultan, Stein Gjessing, Xuan Zhang, Zhusheng Deng, Xixiang Li, and Jianfei He.

TECHNICAL FIELD OF THE INVENTION

The present invention relates generally to network communications, and more particularly, to a versatile system for rate management of aggregate-rate communication services.

BACKGROUND OF THE INVENTION

Ethernet is one of the most widely-installed Local Area Network (LAN) technologies. Users are attracted by a number of advantages of Ethernet services, including ease of use, cost effectiveness, flexibility, and wide rage of service options, etc. Ethernet services have been extended to metropolitan areas and beyond.

Ethernet services may vary in many ways. The Metropolitan Ethernet Forum (MEF) defines two types of Ethernet services: E-Line services, which are point-to-point services; and E-LAN services, which are multipoint services such that each instance of service shares the use of a common underlying physical network. MEF specifies distinct layer-1 and layer-2 E-LAN services. A layer-1 E-LAN service is called an Ethernet LAN (ELAN) service, and a layer-2 E-LAN service is called an Ethernet Virtual LAN (EVLAN) service. The EVLAN allows users to exchange frames as if connected to a shared medium LAN.

Two methods currently used to specify rate guarantees for EVLAN services are port-to-port guarantee and per-port guarantee. Port-to-port guarantee specifies a distinct bandwidth guaranteed for traffic from a specific port to another specific port. This is a traditional guarantee provided in frame relay and private-line services. This method may be more efficient when port-to-port traffic rate is relatively constant.

Per-port guarantee specifies a distinct bandwidth guarantee for traffic originating from each port, without regard to destination ports. This type of guarantee is relatively easy to police as only knowledge of local port ingress traffic is required.

SUMMARY OF THE INVENTION

The present invention provides a system for rate management of communication services. The system comprises at least one aggregation-group sharing a guaranteed-rate; and each member port of the aggregation-group determines an allowed-rate using at least one rate management policy.

The present invention also provides methods for distributing communication messages among the member ports of the aggregation-group.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
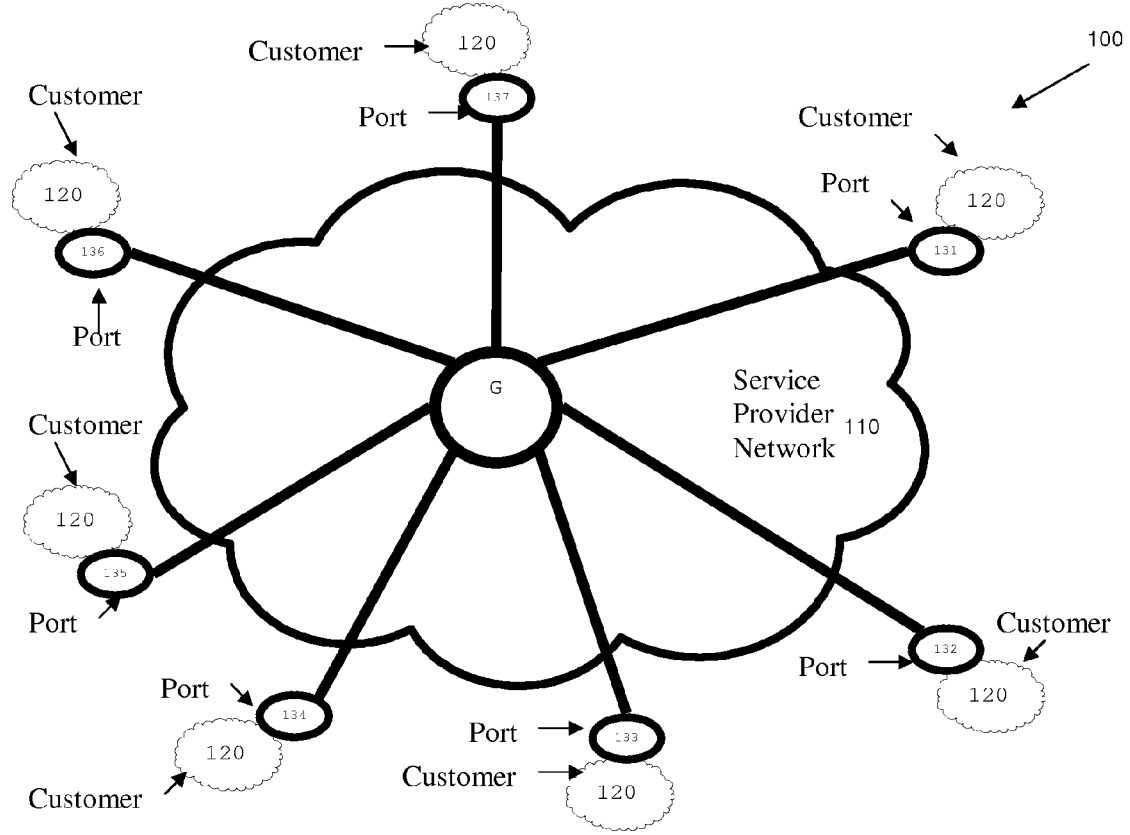
FIG. 1 illustrates an aggregate-rate service model according to the present invention.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The following terms are used in the description of the present invention below:

Adjustment: A method of allowed-rate assignment used when the sum of measured ingress-rates is sufficiently high that continued ramping of rates could result in exhaustion of capacity associated with the aggregation-group.

Aggregation-group: The set of ports that share a guaranteed-rate.

Ingress: The direction from a user of a service to a provider of the service.

Port: The interface by which a user accesses the services of a Service Provider Network. Examples are an 802.1ad Provider Edge Bridge (PEB) port or a Metropolitan Ethernet Forum (MEF) User-Network Interface (UNI).

Service Provider Network: A network offering connectivity services to customers, for example, an IEEE 802.1ad Provider Bridged Network (PBN) or an MEF Metropolitan Ethernet (MEN).

Ramping: A method of allowed-rate assignment in which the allowed-rate is assigned a value that is larger than the current value of a measured ingress-rate.

Rate-message: A message distributed periodically from a port associated with an aggregation-group, to all other ports associated with that aggregation-group, carrying the value of the ingress-rate measured (and possibly smoothed or filtered) by that port.

Service instance: An instance of the connectivity service offered by a Service Provider Network. Connectivity is permitted only between ports associated with the same service instance. Examples are an IEEE 802.1ad Service Virtual Local Area Network (SVLAN) or an MEF Ethernet Virtual Connection (EVC).

Notation used in the present invention is described in the following. For notational convenience, the symbol $\Sigma$ represents $$\sum_{i=0}^{n}$$

unless otherwise specified. $I_{(i,t)}$ indicates the value of I associated with port i at the end of time interval t.

Other identifiers are as follows:

$A_i$ (allowed-rate): The maximum rate at which traffic from a user is admitted to a service provider network at port i of an aggregation-group. $I_i$ always$\leq A_i$. $O_i > A_i$ implies $I_i = A_i$.

B: The minimum amount by which the value of $A_i$ for the next time interval should exceed the current value of $I_i$ when ramping of allowed-rates is performed.

C (committed capacity): Capacity committed by a service provider for use by an aggregation-group on a link within a Service Provider Network. A capacity commitment of C ensures that a specified service guarantee is met at all times. The service provider may commit less bandwidth than C, and assume a risk that the guarantee will not be met at all times.

$d_{ij}$ (delay): Time period, measured in seconds, beginning when a port i has measured its ingress-rate $I_i$, for the most recent time interval, and ending when a port j references the corresponding value $R_i$ in computing S.

D (delay): The maximum value of $d_{ij}$ over all port pairs (i, j) in an aggregation-group.

F (sum of offered rates): Sum of the values of offered rate ($O_i$) over all ports i.

G (guaranteed-rate): A provisioned value such that $\Sigma I_i \geq G$ when ingress-rates have attained a steady-state.

$I_i$ (ingress-rate): Actual (measured) rate of traffic introduced by port i of an aggregation-group. The rate may be low-pass filtered or smoothed to achieve stability.

$O_i$ (offered rate): A traffic rate presented by a user to a service provider at port i of an aggregation-group.

n (number of ports): Number of ports associated with an aggregation-group.

Q: Number of ports in an aggregation-group for which $R_i$ exceeds a computed maximum allowed-rate X.

$R_i$: Value of $I_i$ most recently received by a local port in a rate-message from port i. $R_{local}$ is assigned the current value of $I_{local}$.

S: Sum of $R_i$ over all ports i in an aggregation-group.

$S_{max}$: The maximum value attained by S.

t: A count of the number of elapsed intervals of duration T.

T: A fixed time interval between distribution of a value of $I_i$ by port i of an aggregation-group. Re-computation of the allowed-rate is also performed on this time boundary.

X: The largest value of $A_i$ that may be assigned to any port i in an aggregation-group following a rate adjustment.

Referring now to FIG. 1, an embodiment of an aggregate-rate service model (100) is illustrated. A Service Provider Network (110) offers aggregate-rate communication services to a customer (120). Customer (120) is associated with 7 ports, port (131)-(137), to access Service Provider Network (110). The 7 ports share one guaranteed-rate G, forming an aggregation-group. Service Provider Network (110) may have an arbitrary topology. Ports in an aggregation-group share capacity of the aggregation-group fairly.

Rate-control algorithms may be used to control ingress-rate of each port within the aggregation-group, to ensure aggregate-rate services provided by Service Provider Network (110) comply with a Service Level Agreement (SLA). Each port measures $I_i$ during the current time interval t. At the completion of the time interval t, a port i, e.g. port (131), may distribute a rate-message, containing the measured (and possibly smoothed and/or filtered) ingress-rate value $I_i$, together with the identity of the port i.

Each port within the aggregation-group may receive a rate-message distributed by other ports within the aggregation-group. A port, e.g. port (137), receives a rate-message from a sending port following a delay of at most D seconds. The receiving port (137) saves the value of the ingress-rate, $R_i$, received in a rate-message from a port i.

Thus, each port may obtain ingress-rate information of all other ports in an aggregation-group, and use such ingress-rate information as input to a rate-control algorithm computing an allowed-rate for the next time interval. One embodiment of the rate-control algorithm is to perform ramping if the sum of rates of all ports in an aggregation-group is less than a guaranteed-rate; and perform adjustment if the sum of rates of all ports in an aggregation-group is greater than or equal to a guaranteed-rate.

Rate management policies may be provided to specify the ways in which ports of an aggregation-group share the capacity of the aggregation-group, and ways to manage capacity requirement of each individual port in an aggregation-group. For example, ports associated with an aggregation-group may share the capacity of the aggregation-group equally, or proportionally according to a weighting scheme, or the allowed-rate of one port may be set to a predefined value or restricted to a value that is greater than, or less than, a predefined value. Rate-control algorithms may be used to control individual rate and aggregate-rate of an aggregation-group according to the rate management policy.

Rate-control algorithms may vary according to different rate management policies. One embodiment of rate management policy may be that port members of an aggregation-group share a guaranteed-rate fairly, but not equally. This is the case, for example when one port is a high-capacity server, and other ports are clients. It may be useful to share the guaranteed-rate, but allow the server access to a larger share of the guaranteed-rate.

Using this rate management policy, in one embodiment, each port i may be assigned a weighting factor, $W_i$. When an ingress-rate, $I_i$, is reported via a rate-message, the reported value is normalized by dividing the reported value by $W_i$.

Thus for a local port performing ramping, the term B may be changed to $W_{local}B$ in order to accommodate the weighting factor, and an allowed-rate for the next time interval may be changed to:

$$A_{local} = I_{local} + W_{local}B.$$

That is, a port i, sending at rate $I_i$ during time interval t, may be restricted by $A_i = I_i + W_iB$ during time interval t+1. In the absence of delay, this method of ramping would ensure that $\Sigma I_i \leq G + \Sigma W_iB$ in time interval t+1, since $\Sigma I_i \leq G$ in time interval t, and each port may increase its ingress-rate by no more than $W_iB$.

In the presence of delay D, sufficient additional capacity must exist in order to account for the delayed arrival of rate-messages. During the time period D, the ingress-rate of each port, except the local port, may rise by an additional $W_iBD/T$. Hence, additional capacity $\Sigma W_iBD/T$ (for i≠local) must be committed. Capacity required in the case of weighted fairness may be expressed as $C=G+\Sigma W_i B+\Sigma W_i BD/T$ (for $i \neq$ local in the last item of the expression).

The method of adjustment may also be modified to accommodate the weighting factors. The method of computing the allowed-rate, after the value of X has been determined, may be modified as follows:

$$A_{local}=\text{MIN}(I_{local}, W_{local} X)+W_{local} B.$$

X may be computed iteratively by fractionally increasing, or decreasing, a proposed value of X until the proposed value meets the condition:

$$G \approx \Sigma R_i (\text{for } R_i/W_i < X)+\Sigma W_i X (\text{for } R_i/W_i \geq X).$$

The capacity requirement may be adjusted as follows to accommodate the weighting factors:

$$C=G+\Sigma W_i B+\Sigma W_i BD/T (\text{for } i \neq \text{local in the last item of the expression}).$$

An alternative rate management policy may be that an access rate of an individual port may be restricted. For example, the allowed-rate, $A_i$, at a port i may be restricted to a value less than G. This is useful when a service provider cannot provide access to a port at the full guaranteed-rate G, or when a user does not require access at a rate greater than $A_i$.

One embodiment for this rate management policy is to apply a restrict rate value $P_{local}$ to a port to be restricted. In this case, the value of $A_{local}$ for the next time interval in the method of ramping may be computed as:

$$A_{local}=\text{MIN}(I_{local}+B, P_{local})$$

for a port whose access is limited to $P_{local}$.

In the case of adjustment, the value of $A_{local}$ for the next time interval may be computed as:

$$A_{local}=\text{MIN}(P_{local}, \text{MIN}(I_{local}, X)+B).$$

Another alternative rate management policy may be that a user may be charged for aggregate ingress-rate exceeding a threshold. The method of monitoring performance of an aggregation-group provides an opportunity to charge a higher rate for services when an aggregate ingress-rate exceeds a pre-determined level, e.g., a threshold. Crossing of this threshold may be detected by a performance monitoring application. This method discourages high levels of sustained usage without explicitly preventing such usage. In one embodiment, a user, when using capacity above a guaranteed-rate, may indemnify a service provider by paying a premium rate to offset the increased risk associated with exceeding the capacity committed to the user by the service provider. In this case, the rate-control algorithm is not used to compute the value of policing parameters, but is used to compute when a premium rate is to be charged.

Figure 2:
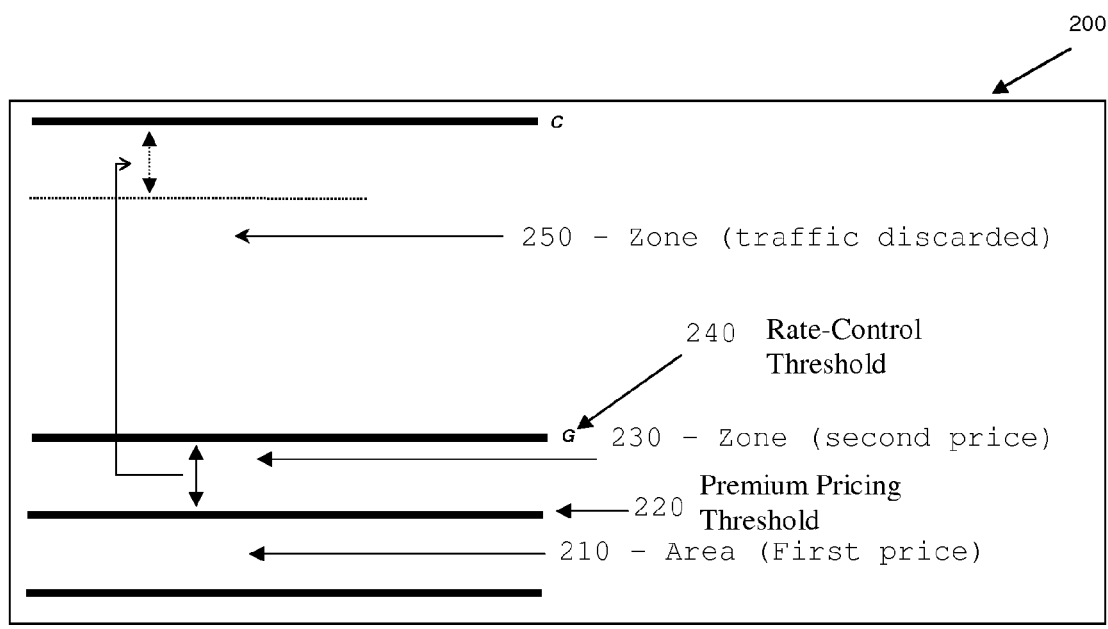
FIG. 2 illustrates two rate-control thresholds in the method of rate-control with premium pricing according to the present invention.

In another alternative rate management policy, the method of premium pricing for an aggregation-group may be combined with a method of rate-control by specifying two threshold values. One embodiment is shown in FIG. 2. Under the first threshold—a premium pricing threshold (220), there is no rate control. Area (210) is a base pricing zone. A user pays a first price if the aggregate-rate is within area (210). If a user crosses premium pricing threshold (220), but is still under the second threshold—a rate-control threshold G (240), i.e. within zone (230) in FIG. 2, then the user pays a second price for aggregate ingress-rate in zone (230). Traffic above the second threshold (240), i.e., in zone (250), does not incur additional charges, but is not guaranteed. Traffic in zone (250) may be discarded, or restricted.

The above embodiment not only has the benefit that a user may reduce costs by shaping usage to a level below a premium price threshold, but also has the flexibility to allow use of bandwidth up to a guaranteed-rate. For a service provider, this embodiment may protect against insufficient resource commitment, and allow premium pricing for higher levels of resource usage.

A rate management policy may provide methods for sharing a guaranteed-rate among ports of an aggregation-group. The method, described in the rate-control algorithms, of apportioning the aggregate-rate among ports is known as a "greedy" method of rate adjustment, as it reduces only the rates of "greedy" (most rate-consuming) ports, while leaving other ports unaffected. The greedy method is described by:

$$G=\Sigma R_i (\text{for } R_i < X)+\Sigma X (\text{for } R_i \geq X).$$

An alternative policy may be that each port of an aggregation-group is entitled to an equal share or a weighted share of a guaranteed-rate. This may be accomplished by a simple division (or weighted division) of the guaranteed-rate among ports as follows:

$$A_j=G/n; \text{ or}$$

$$A_j=(W_j/\Sigma W_j)G.$$

A second alternative policy may be that ports consuming more capacity may be assigned a higher allowed-rate when there is contention for a guaranteed-rate among ports. This may be accomplished by a rate-proportional division of the guaranteed-rate among ports as follows:

$$A_j=(R_j/\Sigma R_i)G.$$

A third alternative policy may be that ports whose ingress-rates are less than a mean rate may not adjust their rates. Other ports share the remaining of a guaranteed-rate. This policy may be expressed as follows:

$$A_j=R_j(R_j \leq G/n); \text{ and}$$

$$A_j=(G-\text{sum of } R_i)/Q(R_i \leq G/n; R_j > G/n; \text{ where } Q \text{ is the number of ports whose ingress-rates satisfy } R_j > G/n.$$

The method for sharing a guaranteed-rate explicitly includes the alternatives described above, and also methods that are conceptually similar.

The rate management policy and rate-control algorithms require distribution of rate-related information associated with each port member of an aggregation-group. In describing the rate-control algorithms and the method of monitoring performance of an aggregation-group, a method is provided for distributing rate-messages from each port to all other ports in the aggregation-group. A rate-message may contain ingress-rate and identity of a distributing port. The distribution may be accomplished by addressing a rate-message to a Group Media Access Control (MAC) address associated with an aggregation-group. This method is known as a Multicast and is well-known to practitioners of the art. The Group MAC address associated with the aggregation-group may be provisioned (or configured) at each port.

An alternative embodiment of the method for distributing rate-messages is to specify an ordering (or sequence) of ports in an aggregation-group. Each port is identified by an Individual Medium Access Control address established by provisioning (or configuration) Rate-messages may then be sent by a port to the next port in sequence. This method is known as a Unicast and is well-known to practitioners of the art. Methods of ordering the ports are well known to practitioners of the art. The ordering may be circular so that the port at the end of the sequence sends rate-messages to the port at the beginning of the sequence. The rate-message may be extended to allow the measured ingress-rate of each port in an aggregation-group to be carried, reducing the number of rate-messages that need be circulated, and to allow identification of the aggregation-group. The sequential method may be used when it is desirable to reduce the number of rate-messages crossing links in a network, at the expense of some additional delay in the transfer of rate information.

A second alternative embodiment may allow a port to send rate-messages in both ascending and descending directions of a sequence. That is, rate-messages are sent in "logically" counter-rotating directions. This reduces the delay in receiving rate information, in exchange for a corresponding increase in the total number of transferred rate-messages. In one embodiment, a control-message is sent in each direction of the logical sequence and carries the rates of approximately half the ports in the aggregation-group.

An additional alternative allows summarization of the rate information. In this case, only a single rate value is sent by a port to its neighbors in the sequence. This value may be, for example, a weighted average of the locally-measured rate and the rate contained in a rate-message, as follows:

$$XmitRateMsg.Rate=(R_i+(n-1)*RcvdRateMsg.Rate)/n.$$

This method is compatible with policies of rate adjustment that do not require knowledge of individual measured ingress-rates, as specified, by the alternative policy for partition of a guaranteed-rate described above, in which each port is entitled to an equal share or a weighted share of the guaranteed-rate.

The methods for distributing rate-messages described in above embodiments may also be used distributing other communication messages among a group of ports sharing a common rate.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for rate management of communication services, comprising:
 a plurality of n ports, together forming an aggregation group sharing a guaranteed-rate G; and
 wherein each port in the aggregation-group determines an allowed-rate using at least one rate management policy,
 wherein the rate management policy comprises:
  assigning a weighting factor $W_i$ (i=1, ... n), to each port in the aggregation-group; and
  determining the allowed-rate for each port in the aggregation-group using a rate-control method,
 wherein each local port is configured to perform the rate-control method, wherein the rate-control method comprises:
  computing the allowed-rate as $MIN(I_{local}, W_{local}X)+W_{local}B$, if sum of the ingress-rates of the aggregation-group is greater than or equal to the guaranteed-rate, wherein X satisfies $G \approx \Sigma R_i$ (for $R_i/W_i<X$)+$\Sigma W_i X$ (for $R_i/W_i \geq X$), B is an amount of rate increase, $R_i$ is an ingress-rate of port i received in a rate-message from port i, $I_{local}$ is an ingress-rate of the local port, and $W_{local}$ is the weighting factor of the local port.

2. The system of claim 1, wherein the worst-case capacity required to support communications among ports of the aggregation-group is $(G+\Sigma W_i B)$, in the absence of delay, and B is an amount of rate increase.

3. The system of claim 1, wherein the worst-case capacity required to support communications among ports of the aggregation-group is $(G+\Sigma W_i B+\Sigma W_i BD/T)$ (for i≠local in the third part of the expression), in the presence of delay D, wherein T is a time period between successive computations of the allowed-rate, and B is an amount of rate increase.

4. The system of claim 1, wherein the rate management policy comprises:
 setting a threshold for the aggregation-group; and
 charging the customer associated with the aggregation-group a different rate if the aggregate-rate of the aggregation-group exceeds the threshold.

5. The system of claim 4, wherein aggregate-rate of the aggregation-group is monitored by a performance monitoring application.

6. The system of claim 1, wherein the rate management policy comprises:
 setting a first threshold and a second threshold for the aggregation-group;
 charging a first price to the customer associated with the aggregation-group, if the aggregate-rate of the aggregation-group is under the first threshold; and
 charging a second price to the customer associated with the aggregation-group, if the aggregate-rate of the aggregation-group exceeds the first threshold and is less than the second threshold.

7. The system of claim 6, further comprising discarding traffic associated with the aggregation-group if the aggregate-rate of the aggregation-group exceeds the second threshold.

8. The system of claim 6, further comprising restricting traffic associated with the aggregation-group if the aggregate-rate of the aggregation-group exceeds the second threshold.

9. The system of claim 1, wherein the ports of the aggregation-group share the guaranteed-rate fairly.

10. The system of claim 1, further comprising a network providing the communication services, the network having an arbitrary topology.

11. The system of claim 1, wherein the rate-message contains an identity of a sending port.

12. The system of claim 1, wherein each port sends rate-messages according to a pre-defined sequence.

13. The system of claim 12, wherein the rate-message is addressed to an individual Media Access Control address.

14. The method system of claim 12, wherein the pre-defined sequence is circular such that a port at the end of the sequence sends rate-messages to a port at the beginning of the sequence.

15. The system of claim 12, wherein the pre-defined sequence is specified such that each of the ports sends rate-messages to a next port in both ascending and descending directions of the sequence.

16. The system of claim 12, wherein the pre-defined sequence is specified such that each of the group of ports sends rate-messages to adjacent ports in the sequence.

17. A system for rate management of communication services comprising:
 a plurality of n ports, together forming an aggregation group sharing a guaranteed-rate G; and
 wherein each port in the aggregation-group determines an allowed-rate using at least one rate management policy,
 wherein the rate management policy comprises:
  determining the allowed-rate using a rate-control method; and restricting the allowed-rate not to exceed a predefined value, wherein each local port is configured to perform the rate-control method, wherein the rate-control method comprises:

computing the allowed-rate as $MIN(P_{local}, MIN(I_{local}, X)+B)$, if sum of the ingress-rates of all ports is greater than or equal to the guaranteed-rate, wherein X satisfies $G=\Sigma R_i$ (for $R_i<X$)$+\Sigma X$ (for $R_i \geq X$), B is an amount of rate increase, $R_i$ is an ingress-rate of port i received in a rate-message from port i, $P_{local}$ is a predefined value for the local port, and $I_{local}$ is an ingress-rate of the local port.

18. The system of claim 17, wherein the rate management policy comprises:

setting a threshold for the aggregation-group; and charging the customer associated with the aggregation-group a different rate if the aggregate-rate of the aggregation-group exceeds the threshold.

19. The system of claim 18, wherein aggregate-rate of the aggregation-group is monitored by a performance monitoring application.

20. The system of claim 17, wherein the rate management policy comprises:

setting a first threshold and a second threshold for the aggregation-group;

charging a first price to the customer associated with the aggregation-group, if the aggregate-rate of the aggregation-group is under the first threshold; and charging a second price to the customer associated with the aggregation-group, if the aggregate-rate of the aggregation-group exceeds the first threshold and is less than the second threshold.

21. The system of claim 20, further comprising discarding traffic associated with the aggregation-group if the aggregate-rate of the aggregation-group exceeds the second threshold.

22. The system of claim 20, further comprising restricting traffic associated with the aggregation-group if the aggregate-rate of the aggregation-group exceeds the second threshold.

23. A system for rate management of communication services, comprising:

a plurality of n ports, together forming an aggregation group sharing a guaranteed-rate G; and wherein each port in the aggregation-group determines an allowed-rate using at least one rate management policy, wherein the rate management policy comprises ports, whose ingress-rate is greater than a mean rate, sharing the remaining of the guaranteed-rate G, subtracted by the sum of ingress-rates of ports, whose ingress-rate is less than or equal to the mean rate:

$A_j=R_j(R_j \leq G/n)$; and $A_j(G-\text{sum of } R_i)/Q(R_i \leq G/n; R_j > G/n)$ $(j=1, \ldots n)$, wherein Q is the number of ports whose ingress-rates satisfy that $R_j>G/n$, $R_j$ is an ingress-rate of port j received in a rate-message from port j, and $A_j$ is the allowed-rate of port j.

24. The system of claim 23 wherein the guaranteed rate G is equal to a service level agreement of a service provider network.

25. The system of claim 24 wherein the service provider network is one of an IEEE 802.1ad Service Virtual Local Area Network and a Metropolitan Ethernet Forum Ethernet Virtual Connection.

* * * * *